Figure 1:
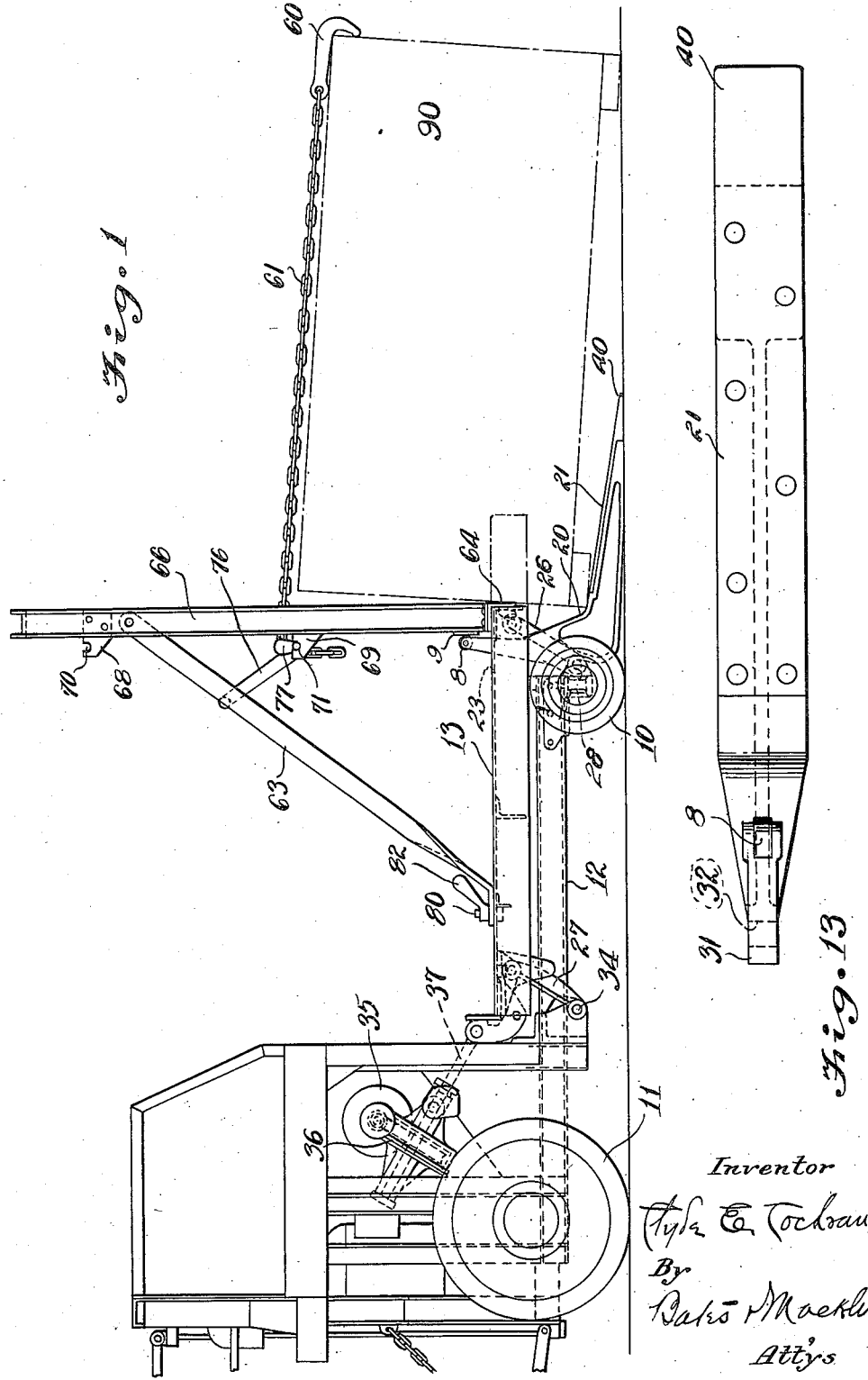

May 11, 1926.

C. E. COCHRAN

INDUSTRIAL TRUCK

Filed Sept. 18, 1922

Inventor

Clyde E. Cochran,

By Bates & Macklin,

Att'ys

May 11, 1926.  1,584,569
C. E. COCHRAN
INDUSTRIAL TRUCK
Filed Sept. 18, 1922  5 Sheets-Sheet 3
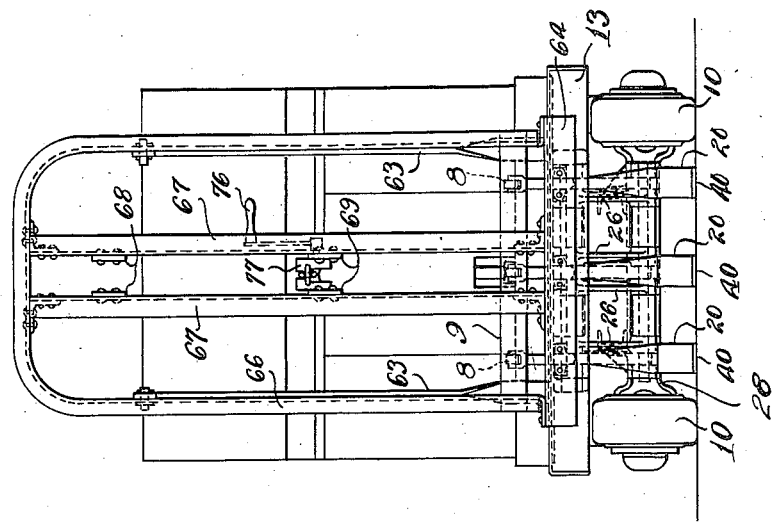
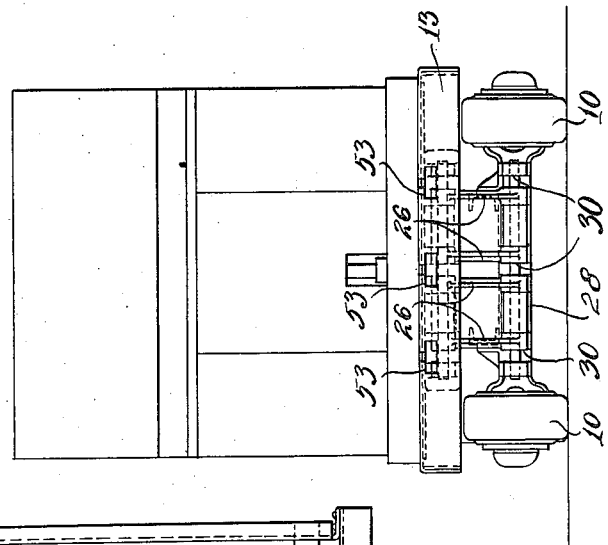
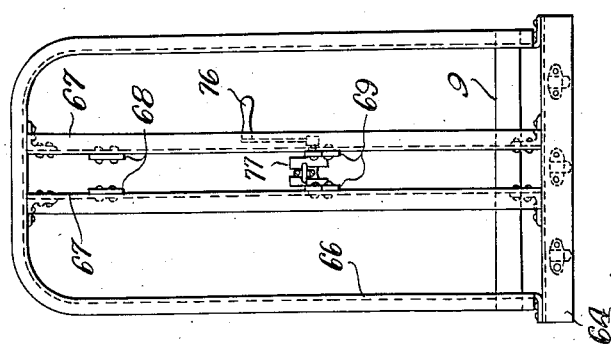
Inventor
Clyde E. Cochran,
By Bates & Macklin,
Attys

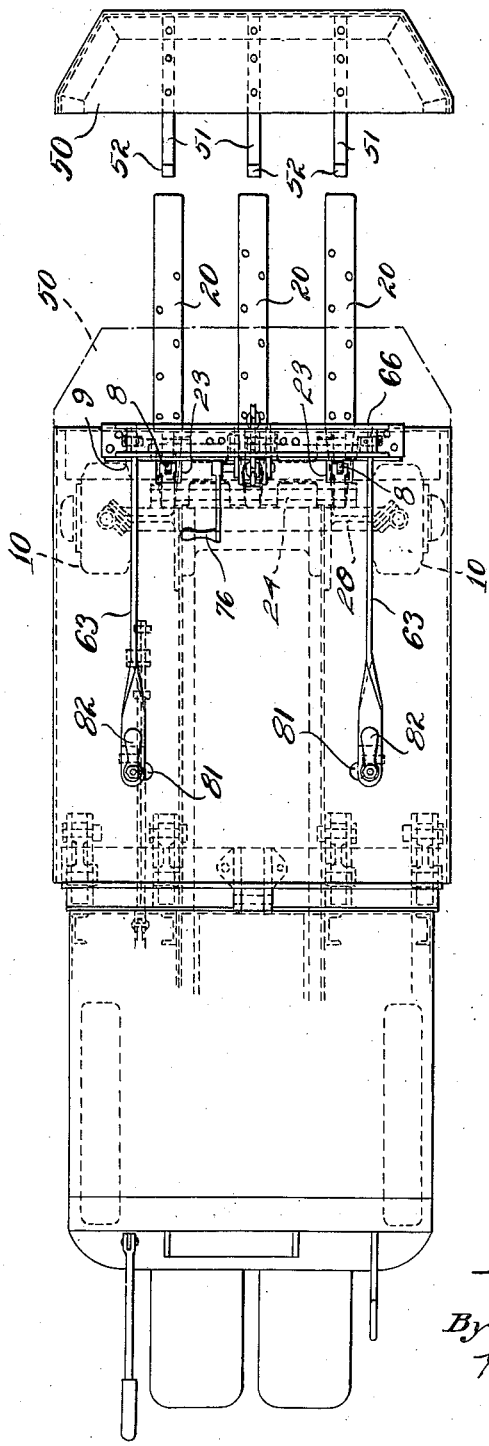

May 11, 1926.　　　　　　　　　1,584,569
C. E. COCHRAN
INDUSTRIAL TRUCK
Filed Sept. 18, 1922　　5 Sheets-Sheet 5
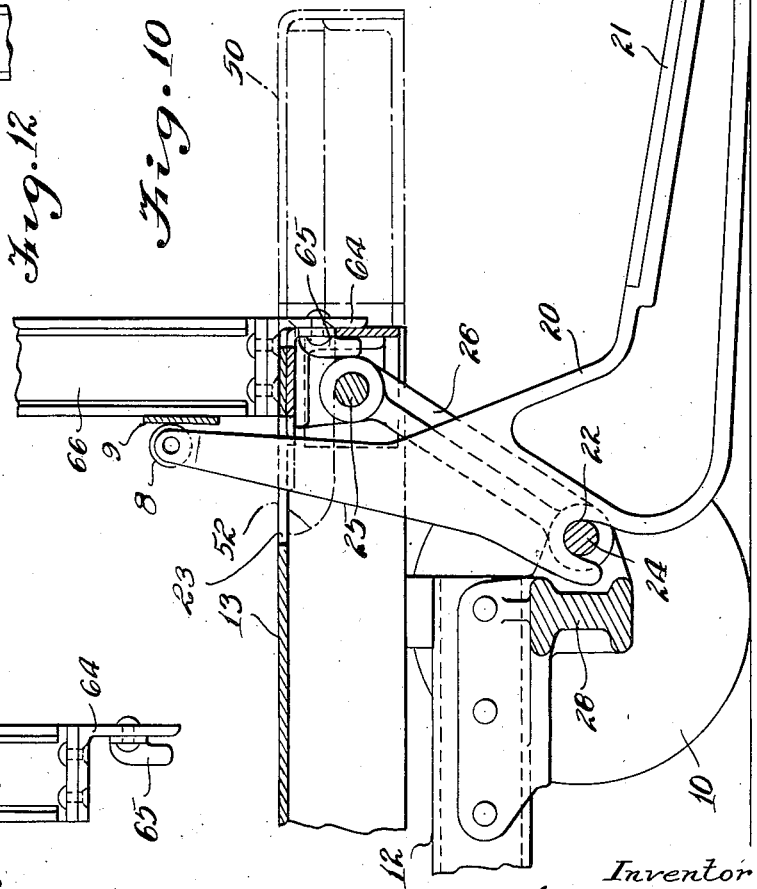
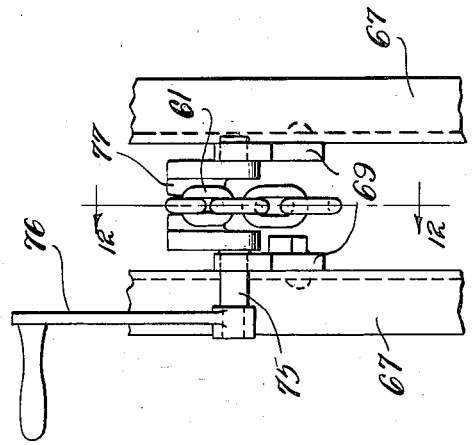
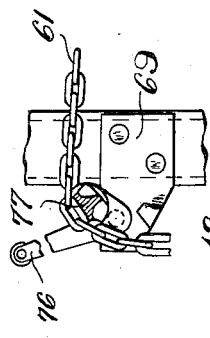

Patented May 11, 1926.

1,584,569

UNITED STATES PATENT OFFICE.

CLYDE E. COCHRAN, OF CLEVELAND, OHIO, ASSIGNOR TO THE ELWELL-PARKER ELECTRIC COMPANY, OF CLEVELAND, OHIO, A CORPORATION OF OHIO.

INDUSTRIAL TRUCK.

Application filed September 18, 1922. Serial No 588,751.

This invention relates to automobile trucks, particularly to those which are employed for industrial use in handling freight in factories, warehouses and the like.

A very frequently used form of truck for these purposes comprises an arrangement wherein a power elevated operating platform, carried by the frame, of a truck, may be thrust under a previously raised movable platform loaded with goods, and then raised with relation to the truck to pick up the platform and goods, and transport the same to any desired point, where they may be deposited by lowering the platform of the truck. It is frequently desirable, however, in handling materials, such as package freight, boxes, crates and the like, to engage the load after the manner of two wheeled hand trucks commonly known as "chisel edge hand trucks". Accordingly, the essential object of the present invention is to arrange such a chisel edge support upon the frame of a lifting platform truck so that without material alteration of the truck the operation of the platform will operate the chisel edge support.

A preferred embodiment of my invention is illustrated in the drawings as associated with a lifting platform truck of the general type shown, described and claimed in the patent to Morris S. Towson, No. 1,233,824, granted July 17, 1917, and more particularly the type of industrial truck shown in my prior Patent, No. 1,260,145 granted March 19, 1918. Additional objects include the provision of a removable upright frame adapted to be attached to the end of the raisable platform of the truck against which the load may be brought when lifted by the wedge support, and a further specific object is the arrangement of convenient means associated with the upright frame for grappling the load to hold it on the edge support, when its center of gravity is beyond the support, as in the case of large boxes or large crated articles.

A further object is the convenient and simple arrangement of the wedge support so that it may be readily adapted to existing types of lifting platform trucks to be operated by the movement of the platform, and with a minimum amount of alteration of the truck, whereby when in position a movement of the truck may thrust the support beneath the packages or articles and raise the same and transport them under the control of the power operated elements of the truck.

The preferred means employed for this purpose is hereinafter fully set forth in the following description which pertains to the drawings and the essential features are summarized in the claims.

In the drawings, Fig. 1 is a side elevation of an automobile truck embodying features of my invention and showing a load diagrammatically in one position; Fig. 2 is a similar view showing the carrier raised with the load in lifted position; Fig. 3 is an end view of the truck shown in Fig. 1 taken from the forward end of the truck, and having the frame for supporting the clamping or grappling mechanism removed therefrom; Fig. 4 is a similar view showing the framework in position on the truck; Fig. 5 is a front view of the boom or frame for supporting the grappling mechanism and showing such frame removed from the truck; Fig. 6 is a plan view of the truck having my invention attached thereto and showing diagramatically a removable end section; Fig. 7 is a plan view of the end section shown diagramatically in Fig. 6; Fig. 8 is a side elevation of such end section; Fig. 9 is an elevation on an enlarged scale showing a manner of attachment of the frame to the truck platform; Fig. 10 is a section taken on an enlarged scale adjacent the forward end of the truck showing the carrier in depressed position and showing the removable platform section diagramatically; Fig. 11 is a view showing a portion of the boom with the means for clamping the grappling mechanism; Fig. 12 is a section taken on the line 12—12 of Fig. 11, and Fig. 13 is a plan view of a carrier removed from the truck.

In the embodiment illustrated, my invention is shown in connection with an industrial truck having wheels 10 and 11, a frame 12 and a raisable platform of low height as at 13. The invention broadly is concerned with means carried by a truck and adapted to be urged beneath a load. Suitable mechanism is then employed for either raising a load upon the carrier or for holding it securely thereto whereby the load is dragged along the ground when the truck is moved in a rearward direction.

The carrier referred to, is illustrated in the various figures as a wedge-shaped member 20 preferably a casting having a hardened steel plate 21 attached to the forward end thereof to provide a bearing surface for engaging a load. Each carrier is shown as an L-shaped member pivoted adjacent the junction of the arms upon a transverse member 24 which member may comprise a shaft extending across the truck and rigidly attached to the axle 28. One arm of each carrier extends forwardly of the truck while the other arm extends upwardly through an opening 23 in the truck platform. This arm is shown as having a wheel 8 which engages a plate 9 extending transversely of the platform and carried by the uprights 66 and 67. I prefer to provide a plurality of such carriers; three being shown, and to mount them in such manner that they may be quickly attached and removed from existing trucks. To this end, I have shown the mid-portion of each carrier as having a recess 22 which is adapted to fit over and engage the transverse member 24.

In Fig. 3, I have shown the truck as having the carriers and upright supporting frame removed. In this figure however, the links 26 which act upon the forward end of the platform 13 are shown in operative position and the spaces on the shaft or member 24 to be occupied by the carriers are indicated at 30. In Fig. 13, each carrier is shown as having a narrow portion 31 which occupies the space 30 and as having an opening 22 through which the shaft 24 may extend. Spacing sleeves and links 26 then, provide convenient means for positioning the carriers relatively to the truck platform.

When the load is to be engaged and raised, the carriers are held in the position indicated in Figs. 1 and 10, as a result of the platform 13 being lowered. The load is engaged by moving the truck forwardly and forcing the points 40 of the carriers beneath the load. Continued forward movement of the truck causes the loads to move upwardly on the ramps of the carriers. If the load is of such character that the center of gravity thereof is not beyond the points of the carriers when moved upwardly thereon, then such load may be raised by tilting the carriers upwardly to bring them into the position indicated in Fig. 2, whereupon the truck and the load may be moved either in a forward or rearward direction.

The means for raising the platform as illustrated in the drawings is fully set forth in the patent heretofore mentioned, and briefly embodies a system of parallel links 26 and 27 which act upon the platform 13 when moved about the pivot points 24 and 34. The mechanism for swinging such links about the respective pivots is embodied in a motor indicated generally at 35, reduction gearing 36 and link 37. The motor, together with the associated gearing, is suspended on a pivot to compensate for variations in platform position. With this arrangement, the weight of each carrier normally holds it in a position, as shown in Fig. 10, wherein the edges of the carrier are close to the ground. Accordingly as the platform is raised, the shaft 25 travels in an arcuate path about the axis of the shaft 24 by virtue of the parallel links 26 and 27. Similarly, the plate 9 is moved in an arcuate path about the shaft 24, but while being moved is maintained in a position parallel to the original position. When this occurs, the carriers being also pivoted about the shaft 24, are swung in an arcuate path, thus raising the points 40 as indicated in Fig. 2.

I have illustrated the means for raising the carriers in connection with a truck having platform raising mechanism illustrated in my patent mentioned. In such patent, the raisable platform extends beyond the forward end of the shaft 25 as indicated diagrammatically in Figs. 1 and 10. Accordingly, since it is frequently desirable to utilize this overhanging portion of the platform, I may provide a removable section 50 which as indicated in Fig. 7 may be provided with tongues 51 having upwardly extending lugs, as at 52. Suitable openings 53, as shown in Fig. 3 may then be provided at the end of the platform through which the tongues 51 may extend. In Fig. 10, the section is shown in position diagrammatically upon the platform in which position, the lugs 52 are in abutting engagement with the under surface of the platform 13. When the section is thus employed, the carriers may still be used on the truck to a limited extent or the truck platform may be utilized for transportation purposes without necessitating the removal of the carriers.

In many cases, however, it is desirable to engage and transport a load having such weight or dimensions as will preclude the transportation by the use of carriers alone. In such cases, I may provide suitable means for engaging a load either to assist in raising it, or to hold it so that it may be dragged over the ground or other supporting surface. To this end, I have illustrated a grappling mechanism including a hook 60 carried at the end of a chain 61. The chain may be supported on the frame which projects vertically above the end of the platform and is supported thereon by struts 63 as indicated in Figs. 1 and 6. The frame preferably carries an angle plate 64 which is shaped to extend over the forward edge of the platform, and to be provided with downwardly extending lugs 65 which are adapted to engage the openings 53 through which the tongues for the removable section are arranged to extend. Projecting upwardly from the ends of the angle plate 64, I have shown a U-shaped channel frame 66 which supports at one end, a pair of members 67, and is rigidly attached, at the other end, to the member 64. The members 67 serve as supports for the chain lock.

The chain lock or grappling means is shown as supported upon a pair of plates 69 which project laterally from the supports 67, and which provide bearings for a crank shaft 75. As shown, the offset portion of the shaft as at 77, is provided with grooves for receiving the links of chain, whereby the chain may be tightened merely by swinging the handle 76 from a position shown in Fig. 1 to that shown in Fig. 2.

The struts 63 for supporting the frame are indicated as inclined members each having one end secured to the U-shaped frame 66, and having the other end removably attached to the platform. I have illustrated the attaching means as comprising a bolt 80, which may be inserted through an opening 81 in the platform floor, and a wing nut 82 in the nature of a hand clamp associated therewith. This construction permits the ready removal or assembling of the frame in accordance with the character of material to be transported.

In operating trucks having the carriers and clamping means as illustrated by my invention, the operator moves the truck forwardly until the load indicated diagrammatically at 90 is forced up the ramp on the carriers, and into engagement with the forward end of the platform. Then the hook 60 is placed over the upper outer corner of the load and the crank 76 is turned downwardly, thus placing sufficient tension upon the chain 61 to hold the hook securely in position. Thereupon the motor 35 is started and the platform 13 is raised to the position indicated in Fig. 2, where the carriers are swung upwardly for lifting the load. When the load is thus suspended, the truck may be moved in either direction. In cases, however, wherein the weight of the load to be raised is such that the truck might be tipped, the carriers may be maintained in a downward position or raised only a slight amount. Then the truck is moved rearwardly to drag the load over the platform or supporting surface therefor.

Other operating features or expedients may be used to transport large loads without using a grappling or clamping means. For example, two trucks facing in opposite directions may engage a load from opposite sides, raise it, and then transport it by moving one truck forwardly, while the other moves rearwardly. Similarly, in handling material such as bundles of pipe, two trucks moving side by side may engage the ends of the pipe and then by moving in the same direction transport the load. In such cases, one truck may be moved faster than the other, whereupon the load may be skewed, thus enabling the trucks to be operated in a narrower space.

I claim:—

1. The combination with a truck having a raisable platform, a tilting support adapted to be projected beneath and pick up a load, and operative connections between the tilting support and the platform, including an upright frame and a reacting means between the tilting support and upright frame disposed above the platform.

2. In a truck, the combination, with a frame, of a horizontal lifting platform, a tilting support adapted to be projected beneath and pick up a load, means for pivoting the support to the frame, and means for connecting the support to the platform above the top surface of the latter to cause it to raise and lower with the corresponding movement of the platform, by swinging about its pivot, and power operating mechanism for raising the platform.

3. In a device of the class described, the combination with a truck frame, of a member movable relatively thereto, a wedge-shaped carrier pivotally connected to said frame, and associated with said member, a removable upright frame positioned above the forward end of the truck frame and engaging the wedge shaped carrier, and adjustable grappling means mounted on the upright frame and adapted to engage the top of a load for retaining it on said carrier.

4. In combination, a truck frame, a raisable platform having an opening therein and carried thereby, a transverse shaft on the frame, a wedge-shaped carrier having a recess adapted to engage said shaft, and means extending through said opening whereby movement of said platform causes movement of said carrier about said shaft.

5. In combination, a frame, a raisable platform having an opening therein, means for moving the platform relatively to the frame, a member projecting upwardly from the platform adjacent said opening, and an L-shaped carrier pivoted to the frame and having one arm projecting forwardly thereof, and having the other arm extending through the opening and engaging said member, said engagement permitting relative motion between the carrier and platform, and causing simultaneous movement of the platform and carrier.

6. In combination, a truck frame, a platform movable relatively thereto and having an opening therein, spaced members projecting upwardly from the platform and having a transverse connecting plate thereon, carriers pivotally mounted on the frame, and having a portion thereof in engagement with said plate, whereby movement of the platform causes simultaneous movement of the carriers.

In testimony whereof, I hereunto affix m signature.

CLYDE E. COCHRAN.